United States Patent [19]
Kogelnik et al.

[11] Patent Number: 4,787,693
[45] Date of Patent: Nov. 29, 1988

[54] PASSIVE STAR COUPLER

[75] Inventors: Herwig W. Kogelnik, Rumson; Adel A. M. Saleh, Holmdel, both of N.J.

[73] Assignee: American Telephone and Telegraph Company, AT&T Bell Laboratories, Murray Hill, N.J.

[21] Appl. No.: 115,942

[22] Filed: Nov. 2, 1987

[51] Int. Cl.[4] .............................................. G02B 6/28
[52] U.S. Cl. ................................................. 350/96.16
[58] Field of Search .............. 350/96.15, 96.16, 96.19; 370/1, 3

[56] References Cited

U.S. PATENT DOCUMENTS

| | | | |
|---|---|---|---|
| 4,392,712 | 7/1983 | Ozeki | 350/96.16 |
| 4,457,581 | 7/1984 | Johnson et al. | 350/96.16 |
| 4,528,695 | 7/1985 | Khoe | 455/612 |
| 4,540,278 | 3/1987 | Maciejko et al. | 350/96.20 |
| 4,573,215 | 2/1986 | Oats et al. | 455/607 |
| 4,590,619 | 5/1986 | Winzer | 455/612 |
| 4,653,845 | 3/1987 | Tremblay et al. | 350/96.16 |
| 4,714,313 | 12/1987 | Kapany et al. | 350/96.16 |

OTHER PUBLICATIONS

Porter, "An Experiment Fiber Optic Data Bus System and Design Considerations," Feb. 1978, pp. We-5.-1-5.13.
D. E. Altman, Naval Electronics Laboratory Center, Aug. 1976, "Fiber Optics Applications in the Shipboard Data Multiplex System," pp. 26-35.
Coyne, Laser Focus, Oct. 1979, vol. 15, No. 10, "Coupling: Do it with a Star," pp. 60-66.
Rawson, Eric, "Fibernet: Multimode Optical Fibers for Local Computer Networks," IEEE Transactions on Communications, vol. Com-26, No. 7, Jul. 1978, pp. 983-990.
Johnson et al., "Low-Loss Reflection-Star Couplers for Optical-Fiber Distribution Systems," Applied Physics Letters, vol. 35, No. 7, Oct. 1979, pp. 479-481.
Johnson et al., "Fused Biconical Tapered Fiber-Optic Devices: Application to Data Buses," Fiber and Integrated Optics, vol. 3, No. 2-3, Jul. 1980, pp. 263-281.
Tebo, Albert, "Fiber-Optic Couplers: Directional and Otherwise," Electro-Optical Systems Design, vol. 13, No. 11, Nov. 1981, pp. 25-45.

Primary Examiner—William L. Sikes
Assistant Examiner—Frank González
Attorney, Agent, or Firm—Eli Weiss

[57] ABSTRACT

A star coupler for a single-mode-fiber optical local area network which reduces the amount of fiber required by a factor of two and diminishes the number of components by one-half. This savings in fiber and components is effected by "reflecting" signals which appear at various locations of the network back toward the input ports. The arrangement forms a broadcast-type of local area network where a message transmitted by any user can be received by all users.

3 Claims, 7 Drawing Sheets

PASSIVE STAR COUPLER

BACKGROUND OF THE INVENTION

1. Field of the Invention

This invention relates to star couplers for the distribution of signals in optical communication systems.

2. Description of the Prior Art

A key component in many architectures of high-speed, optical signal distribution systems is a single-mode-fiber passive star coupler. Under ideal conditions, a transmissive star coupler having n inputs and n outputs, hereinafter referred to as an n×n star, divides the power entering any of its n input ports equally between its n output ports. Naturally, there is some loss of power within the star coupler due to absorption and scattering. The n×n star coupler can be used as the central node of a high speed, optical, local-area network where each user would be connected by two fibers—one for transmissions to the input side of the star, and the other for reception from the output side of the star. This arrangement creates a broadcast-type local-area network where a message which is transmitted by any user can be received by all users. In use, different messages can be transmitted and received simultaneously by the various users through the application of any of a number of protocols such as wavelength—division multiple access or time-division multiple access. A disadvantage of the transmissive star architecture is that a large amount of fiber and a relatively large number of components are required for implementation.

SUMMARY OF THE INVENTION

A single mode fiber-optic star coupler in accordance with the principles of this invention is disclosed which reduces substantially both the amount of fiber and the number of components required to form a star coupler. More specifically, a reflective element is positioned to "reflect back" into the output ports the signal received from the output port. A signal which enters any port of the "reflective" star coupler is divided equally between all of the output ports. The reflective element at the output ports reflects the signals back into the output ports. With the "reflective" star network, each user is connected to the star coupler with but a single optical fiber, not the normally required two optical fibers; and, the number of components used to make a "reflective" star network are reduced substantially. Each user, by using diplexers at their own locations, can separate the transmitted signal from the received signal.

BRIEF DESCRIPTION OF THE DRAWING

A more complete understnading of the invention can be obtained by reading the following description of specific illustrative embodiments of the invention in conjunction with the appended drawing in which.

DETAILED DESCRIPTION

In the invention ordinary directional couplers and other simple components are used for constructing reflective, single-mode, fiber-optic n-stars. Therefore, architectures for constructing single-mode fiber "transmissive" stars, which are used as building blocks for "reflective" stars, will be reviewed briefly.

Figure 1:
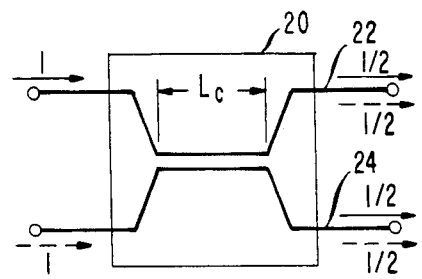
FIG. 1 is a single mode, evanescent-wave, 3-dB coupler used as a passive, transmissive 2×2 star.

The 3-dB coupler 20 of FIG. 1 is a single-mode-fiber transmissive star. More accurately, is it is a 2×2 star. It can be manufactured by bringing the cores of two single-mode fibers 22, 24 sufficiently close together over an appropriate coupling lengh $L_c$.

Figure 2:
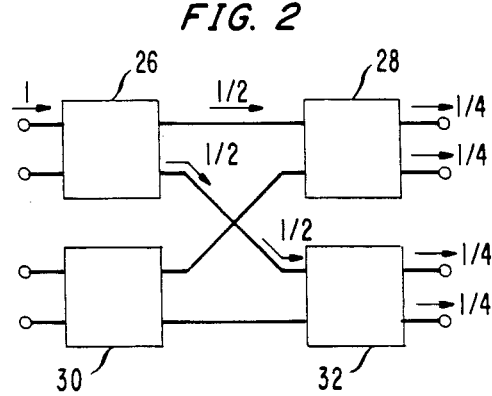
FIG. 2 is a transmissive 4×4 star made of four 2×2 stars.

A 2×2 star can be used as a building block to construct larger n-stars, where n is equal to an arbitrary power of two. For example, FIG. 2 shows a transmissive 4×4 star made of four 2×2 stars 26, 28, 30, 32. Additional examples are the transmission 16×16 stars of FIGS. 3 and 4. which are identical from a topological point of view. They each contain 32 2×2 stars.

In general, a transmissive n×n star, with n equaling a power of two, requires $\log_2(n)$ stages, where each contains (n/2) 2×2 stars, for a total of (n/2) $\log_2(n)$ 2×2 stars. The loss suffered by signals propagating through the structure is proportional to the number of stages which are traversed.

Figure 3:
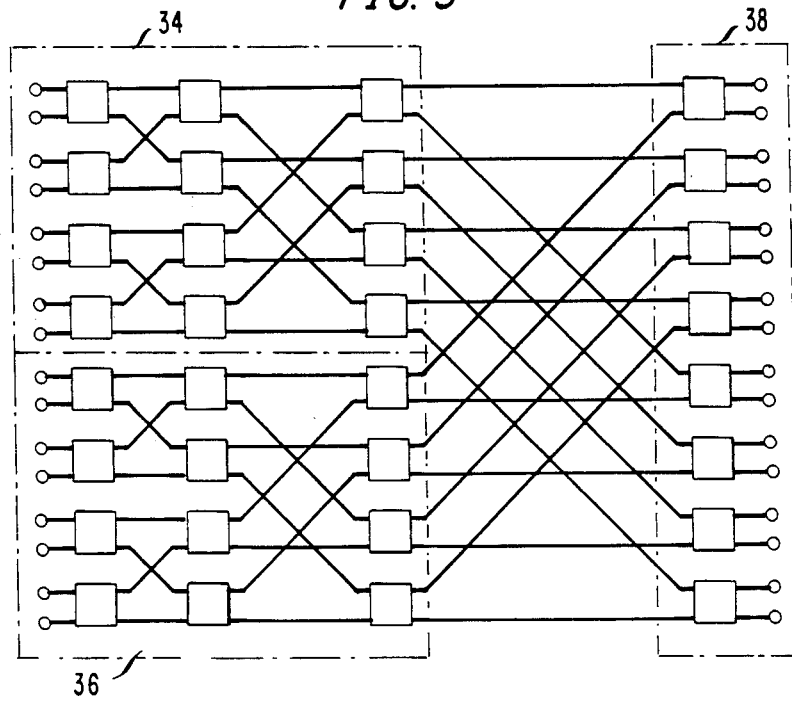
FIG. 3 is a transmissive 16×16 star made of 32 2×2 stars using a cube or standard FFT connection algorithm.
Figure 4:
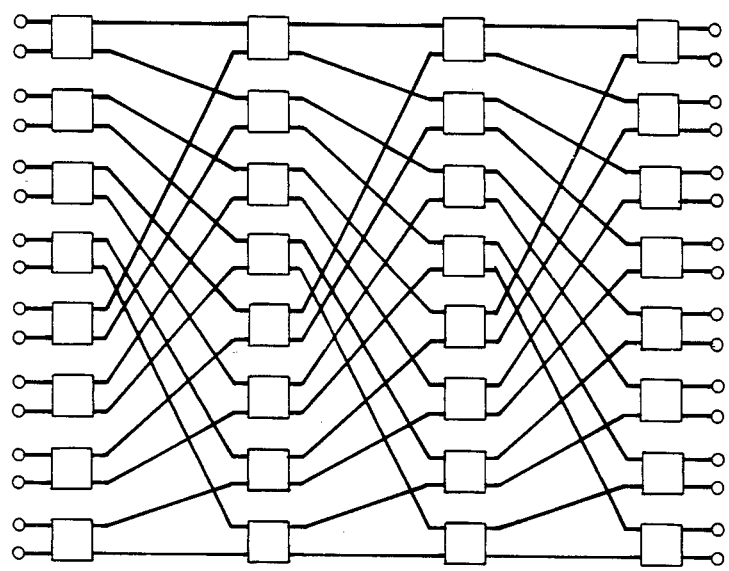
FIG. 4 is a transmissive 16×16 star made of 32 2×2 stars using a perfect-shuffle or identical-stages connection algorithm.

The arrangement of FIG. 3, which resembles that of the standard Fast Fourier transform algorithm is more formally known as the cube algorithm. The different spacings between the various stages of FIG. 3 were chosen to yield the same slope for all inclined connections, which may be advantageous in an integrated-optics implementation. The arrangement scheme of FIG. 4, which produces identical interconnection stages, is more formally known as the perfect-shuffle algorithm. Other layouts are also possible.

A requirement of transmissive and reflective stars is that each pair of input and output ports must be connected by only one path. Having more than one path between two ports will result in unreliable operation caused by destructive and constructive multipath interference. While the absence of multipaths is somewhat hard to verify in FIG. 4, the hierarchical nature of the layout of FIG. 3 makes this task more systematic. For example, FIG. 3 can be considered to be the cascade of two separate 8×8 stars 34, 36, and eight 2×2 stars 38. Since the two inputs of each of the 2×2 stars are from different 8×8 stars, no multipaths exist in the last interconnection stage. Proceeding further, each 8×8 star can be considered to be the cascade of two 4×4 stars (the top and the bottom halves of the left two stages of the 8×8 star) and four 2×2 stars (the right stage of the 8×8 star). Again, this interconnection stage has no multipaths, for the same reasons given above. Proceeding in this manner, it is possible to verify that the structure is free of multipaths.

In general, a transmissive mn×mn star which is free of multipaths can be constructed by cascading a stage of m n×n stars and a stage of n m×m stars with the inputs of each of the m×m stars connected to the outputs of different n×n stars.

Thus far, only transmissive stars based on the 2×2 star coupler have been considered. This restricts the number of ports to a power of two. However, transmissive stars whose number of ports is a power of 3 are also possible. Actually, transmissive stars having a number of ports which is the product of arbitrary powers of two and three can be constructed.

"Transmissive" stars are discussed above because they can be considered to be the basis for forming "reflective" stars in accordance with the principles of this invention. But, it should be noted that the simple addition of a reflective surface to the output port of a single-mode-fiber transmissive star will not produce a reflective star. This is because a multipath situation would occur, which, as noted previously, causes unpredictable and unstable outputs. More specifically, there would be many different paths for the signal entering any input port and ultimately "reflected back" out of any port.

Figure 5:
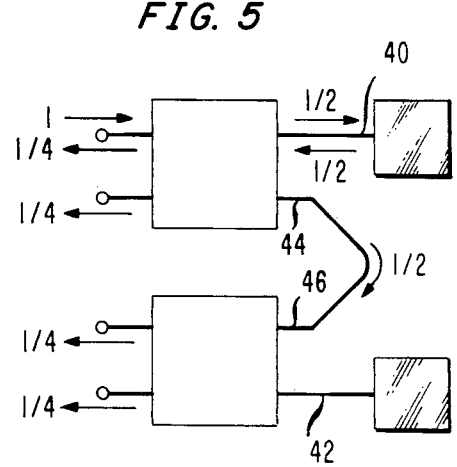
FIG. 5 is a reflective star in accordance with the principles of the invention.

A multipath-free, "reflective" 4 star made of two transmissive 2×2 stars and two mirrors is shown in FIG. 5. Tracing a signal through the structure, it can be determined that a signal which enters any port will emerge equally divided among the four posts with a single path to each port.

There will now be disclosed how "reflective" n-stars can be constructed where n is a perfect square; e.g., 4, 16, 64, 256 or 1024. As will be made clear, if $n=m^2$, the construction of the reflective star is based on the availability of "transmissive" m×m stars.

Briefly, a reflective star can be obtained by bisecting the vertically symmetric transmissive 4×4 star of FIG. 2 along its vertical axis of symmetry, removing the right half, and inserting a vertical reflecting surface such as a mirror or the like at the bisection line. In effect, as shown in FIG. 5, the insertion of the single reflecting surface is equivalent to terminating each of the two fibers 40, 42 that are cut at a right angle with a reflecting surface, and splicing together the two fibers 44, 46 that are cut at an oblique angle. Another way of obtaining FIG. 5 is by folding the right-hand side of FIG. 2 about the vertical axis of symmetry onto the left-hand side and conceptually "uniting" together the two folded halves. With either approach, the equally divided signals that emerged from the ports on the right-hand side of FIG. 2 now are "reflected back" from the ports on the left-hand side.

Figure 6:
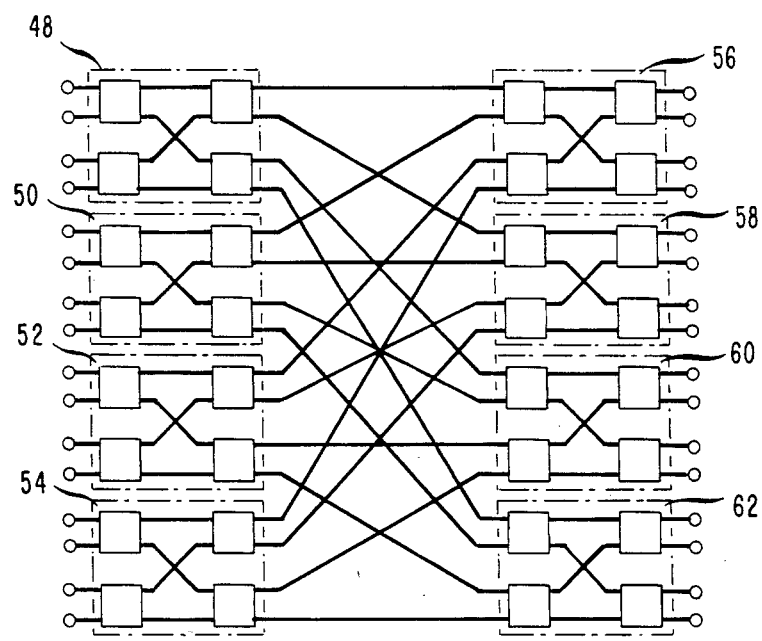
FIG. 6 is a transmissive star of FIG. 3 or 4 rearranged to produce a symmetric transmissive 16×16 star.
Figure 7:
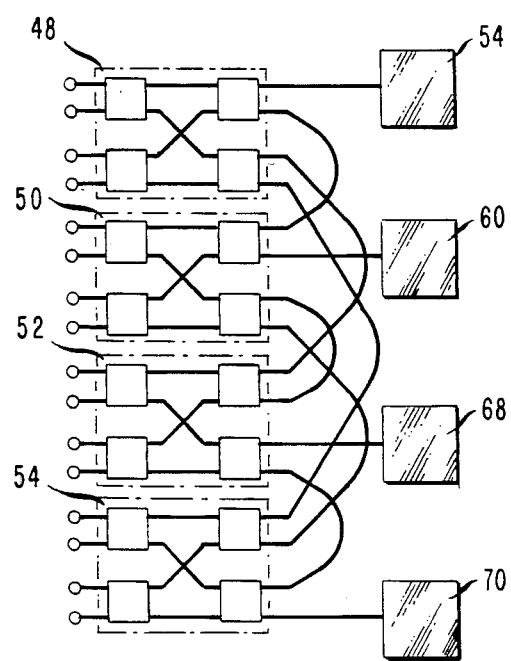
FIG. 7 is a 16 star in accordance with the principles of the invention.

To construct a "reflective" 16-star using the above procedure, a vertically symmetrical transmissive 16×16 star is first obtained. Note that neither of the 16×16 star structure of FIGS. 3 and 4 satisfy this symmetry requirement. However, by properly rearranging the positions of the various 2×2 stars in either FIG. 3 or 4, the desired symmetrical 16×16 star illustrated in FIG. 6 is obtained. Note that eight transmissive 4×4 stars 48, 50, 52, 54, 56, 58, 60, 62 can be segregated. Applying to this structure the concept of vertical bisection and insertion of a reflective surface, or the concept of folding about the vertical axis of symmetry, the reflective 16-star illustrated in FIG. 7 is obtained. It consists of four transmissive 4×4 stars 48, 50, 52, 54 (or 16 transmissive 2×2 stars) and four reflective surfaces 64, 66, 68, 70.

Note that there are half as many stages of 2×2 stars in the above "reflective" n-stars compared to their "transmissive" counterparts. This factor-of-two savings in components in another advantage of "reflective" stars over "transmissive" stars. Additionally, the amount of fiber needed for a local area network transmission system is also reduced by one-half. Note, the signal has to traverse the structure twice in the reflective case. Thus, the signal loss of reflective stars and transmissive stars with the same number of ports are identical.

Figure 8:
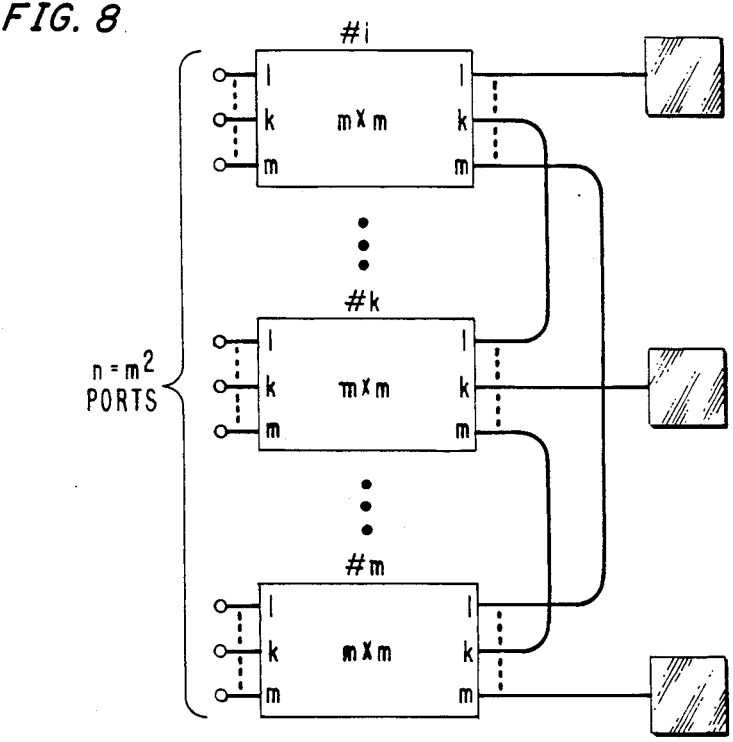
FIG. 8 is a general arrangement of a reflective n-star in accordance with the principles of the invention.

The arrangement of an arbitrary reflective n-star, with $n=m^2$, which is a natural generalization of FIGS. 5 (n=4) and 7(n=16) is illustrated in FIG. 8. Referring to FIG. 8, there is illustrated m transmissive m×m stars and m reflective surfaces. The connection algorithm of the ports on the right hand side of the figure is (1) Port i of m×m star #i, where i=1,2, ..., m, is terminated in a reflective surface. (2) Port i of m×m star #j, i,j=1,2, ..., m i≠j, is connected to port j of m×m star #i.

The arrangement of FIG. 8 is also applicable for all values of n of the form $n=m^2$, not just those that are powers of two. The only necessary condition is that it should be possible to construct transmissive m×m stars. Note, for example, by eliminating the missing ports in FIG. 8, which are indicated by the dots, the figure then becomes a representation of a reflective 9-star.

Reflective n-stars, where n is twice a perfect square, e.g., 8, 32, 128, or 512 are also possible. As will be made clear shortly, if $n=2m^2$, the construction is based on the availability of transmissive m×m stars.

Figure 9:
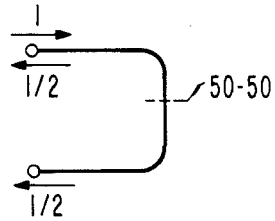
FIG. 9 is a reflective 2×2 star formed by using a half-reflecting surface within the fiber.
Figure 10:
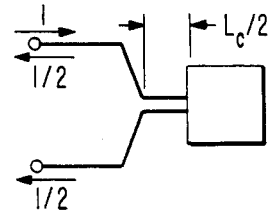
FIG. 10 is a reflective 2×2 star formed by terminating with a reflecting surface.
Figure 11:
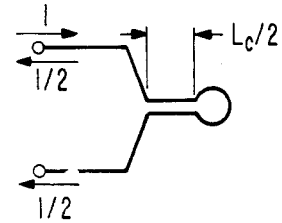
FIG. 11 is a reflective 2×2 star formed by terminating with a fiber loop of arbitrary length.

FIGS. 9, 10 and 11 shows three possible realizations of reflective 2-stars. FIG. 9, which can be considered to be the representative of reflective 2-stars, simply employs a half-reflective surface such as a half-reflective mirror or the like within the fiber. This can be made, for example, by polishing the ends of two fibers, depositing an appropriate half-reflective coating on one of the ends, and then splicing it to the other end. Various other realizations also exist. The realization of FIG. 10 is obtained by vertically bisecting the evanescent-wave 3-dB coupler of FIG. 1 and terminating half of the structure with a mirror. Or, the mirror of FIG. 10 can be replaced by a fiber loop of arbitrary length as depicted in FIG. 11.

A reflective 8-star can also be obtained. The construction is more subtle than that used in the previous section to construct reflective 4- and 16-stars because it is not possible to construct a physically symmetric transmissive 8×8 star out of 2×2 stars. However, as shown in FIG. 12, a functionally symmetric transmissive 8×8 star can be constructed by treating the 8-port box 72 in the middle of the figure as a single structure.

Figure 12:
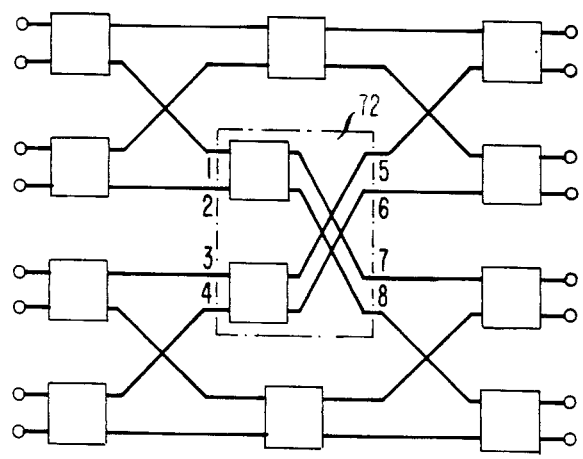
FIG. 12 is a transmissive 8×8 star with its component 2×2 stars arranged to produce a functionally symmetric structure.

For Example, FIG. 12 can be conceptually bisected along its vertical line of symmetry and a mirror positioned at that line. Alternatively, the right-hand side of the figure can be folded on its left-hand side and the two folded halves can be "united" together. The resulting structure, which is the desired reflective 8-star, is shown in FIG. 13, consists of five transmissive 2×2 stars 74, 76, 78, 80, 82 and two reflective 2-stars.

Figure 13:
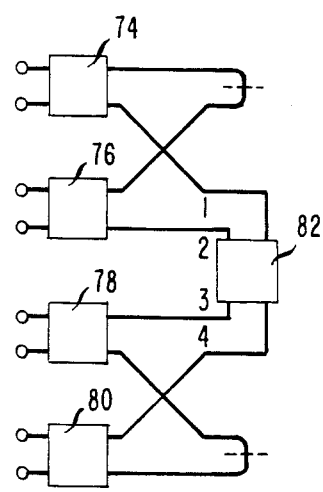
FIG. 13 is a reflective star in accordance with the principles of the invention.

The bisection of the top and bottom transmissive 2×2 stars in the middle of FIG. 12 produces the two reflective 2-stars at the top and bottom right of FIG. 13. The transmissive 2×2 star at the middle of the right-hand side of FIG. 13, is, functionally, a vertical bisection (or folding) of the box 72 in FIG. 12. This can be verified by noting that an input signal, for example, at port 1 or 2 of box 72 is divided equally between ports 7 and 8, which, upon folding, coincide with ports 3 and 4. Thus, in the resulting folded structure, an input signal at port 1 or 2 will be equally divided and directed to ports 3 and 4.

Note that the two crossovers in FIG. 13 can be eliminated by horizontally turning the top 74 and bottom 80 2×2 stars on the left-hand side. As shown, however, FIG. 13 is a natural consequence of the development process that is more suitable for generalization to other values of n.

Figure 14:
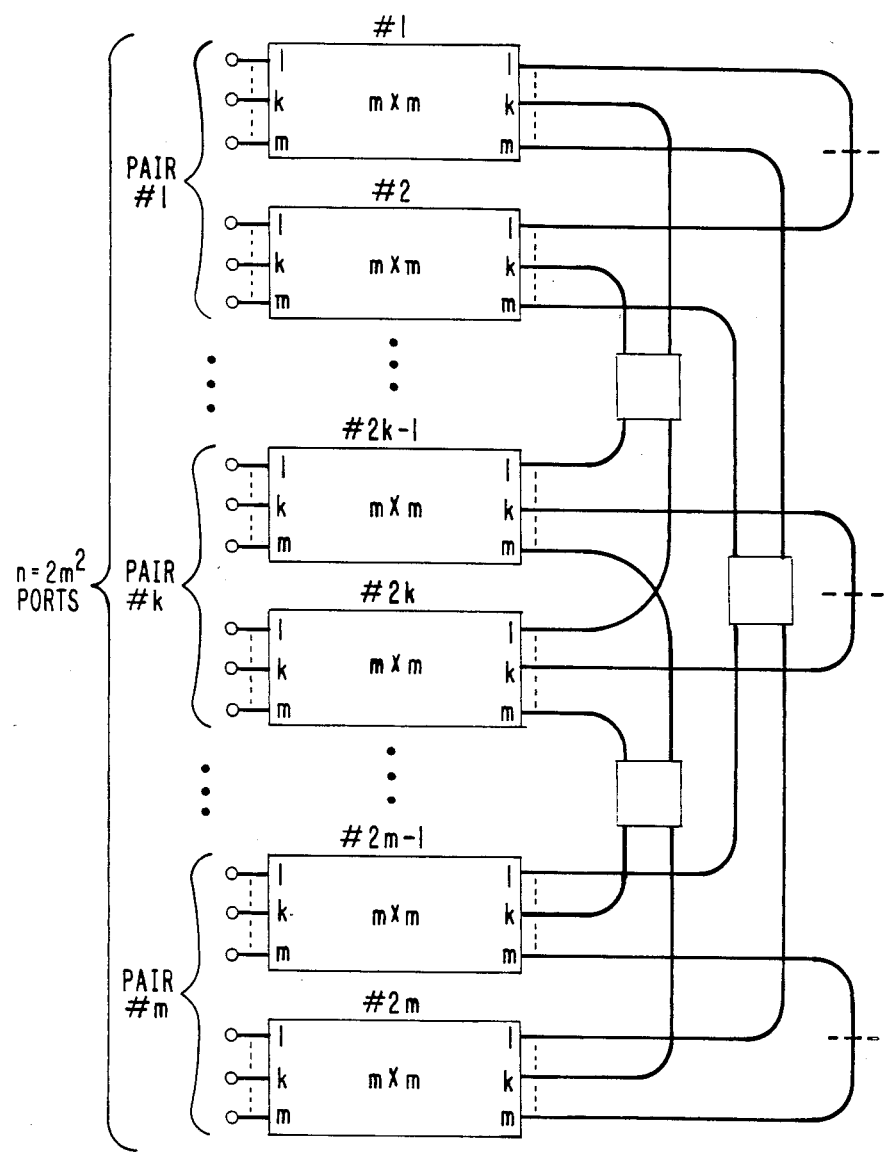
FIG. 14 is a general arrangement of a reflective star in accordance with the principles of the invention where $n=2m^2$.

Referring now to FIG. 14, there is illustrated the general arrangement of a reflective n-star, where $n=2m^2$ and m is arbitrary. This arrangement requires 2m transmissive m×m stars (which are grouped in m pairs), m reflective 2-stars (each joining one pair of the m×m stars), and $m(m-1)/2$ vertically oriented transmissive 2×2 stars (which connect together the different pairs of m×m stars). The connection algorithm of the ports on the right-hand side of the figure is as follows: (1)Ports i of the top and the bottom m×m stars of pair #i, $i=1,2,\ldots$, m, are joined together via a reflective 2-star. (2)Ports i of the top and the bottom m×m stars of pair #j, $i,j=1,2,\ldots$, m, $i\neq j$, are connected via a vertically oriented transmissive 2×2 star to ports j of the top and the bottom m×m stars of pair #i.

The arrangement of FIG. 14 is also applicable for all values of n of the form $n=2m^2$, not just those that are powers of two. For example, by eliminating the missing ports in FIG. 13, which are indicated by the dots, FIG. 14 becomes a representation of a reflective 18-star.

Reflective, single-mode, fiber-optic, n-star couplers, for n equalling either a perfect square ($n=m^2$) or twice a perfect square ($n=2m^2$) are disclosed above. The constructions described are possible when transmissive m×m stars can be built. This is known to be the case, for example, when m is a power of two, a power of three; or, more generally, a product of a power of two and a power of three. The constructions for the case of $n=m^2$ (FIG. 8) require the introduction of reflective surfaces such as mirrors or the like, while those for $n=2m^2$ (FIG. 14) require the introduction of reflective 2-stars, which were also described.

Actually, the general arrangements of FIGS. 8 and 14 can be further generalized to construct reflective n-stars with n equalling an arbitrary multiple of a perfect square, i.e., $n=lm^2$. Such a generalization, which is presented in FIG. 15, requires the use of ml transmissive m×m stars, $m(m-1)/2$ transmissive 1×1 stars, and m reflective l-stars. The connection algorithm of the ports on the right-hand side of the figure is as follows: (1) Ports i of the l transmissive m×m stars of l-group i, $i=1,2,\ldots$, m, are joined (2)Ports i of the l transmissive m×m stars of l-group #j, $i,j=1,2,\ldots$ m, $i\neq j$, are connected via a transmissive 1×1 star to ports j of the l transmissive m×m stars of l-group #i.

It is clear that FIG. 14 can be further generalized to construct reflective n-stars with n equalling an arbitrary multiple of a perfect square, i.e., $n=lm^2$. Such a generalization, which is presented in FIG. 15, requires the use of ml transmissive m×m stars, $m(m-1)/2$ transmissive 1×1 stars, and m reflective l-stars. The connection algorithm of the ports on the right-hand side of the figure is as follows: (1)Ports i of the l transmissive m×m stars of l-group i, $i=1,2,\ldots$, m, are joined together via a reflective l-star. (2) Ports i of the l transmissive m×m stars of l-group #j, $i,j=1,2,\ldots$ m, $i\neq j$, are connected via a vertically oriented transmissive 1×1 star to ports j of the l transmissive m×m stars of l-group #i.

Figure 15:
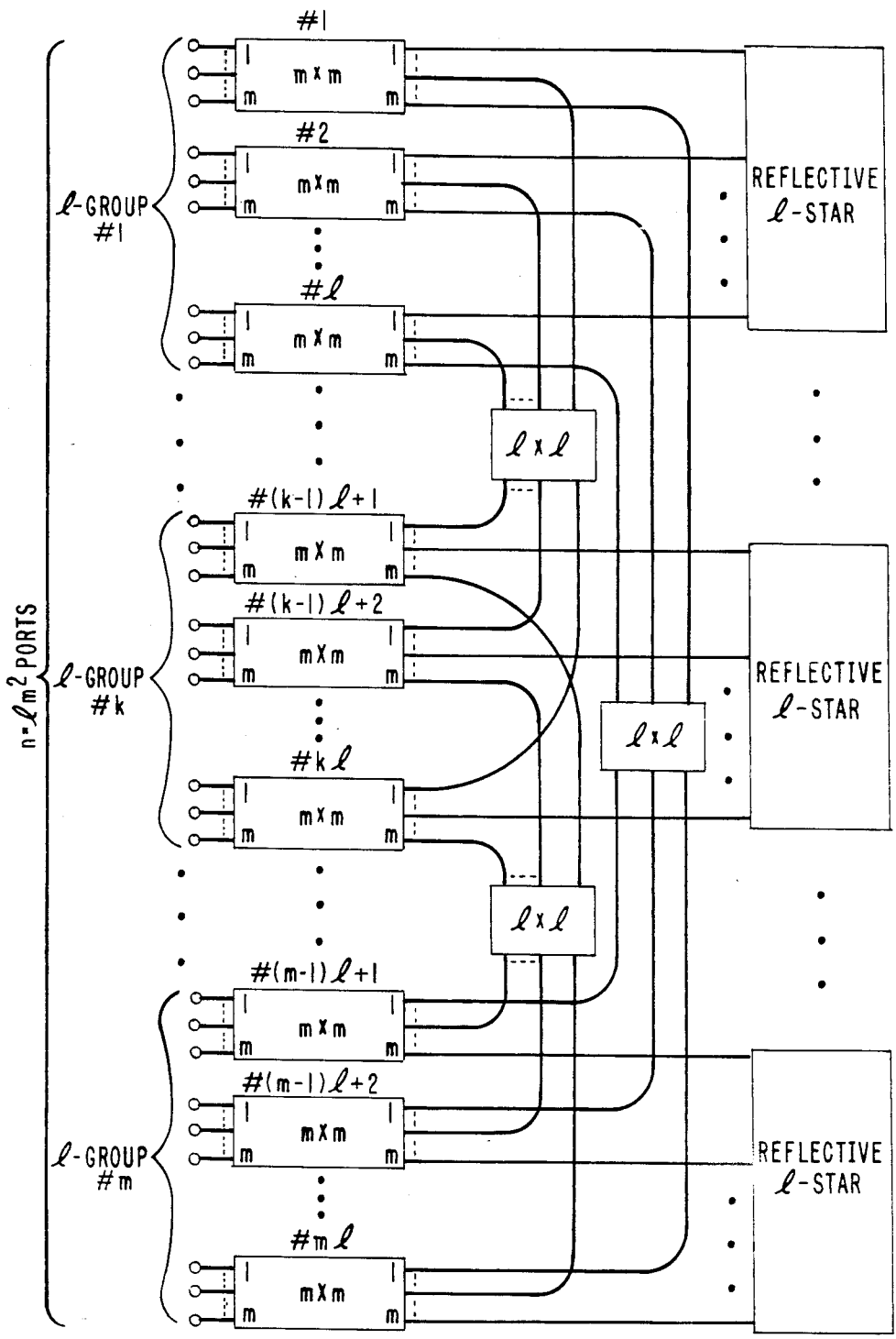
FIG. 15 is a generalization of the arrangements of FIGS. 8 and 14 to yield a reflective n-star where $n=lm^2$.

It is clear that FIG. 14 is a special case of FIG. 15 for $l=2$. Moreover, upon the realizations that a mirror can be considered as a reflective 1-star and that a straight-through fiber connection can be considered as a transmissive 1×1 star, it also becomes clear that FIG. 8 is indeed a specia $l=1$.

If l is a perfect square, then the reflective l-stars and the transmissive 1×1 stars in FIG. 15 can be absorbed in the transmissive m×m-star groups, which, in fact, would make the resulting structure topologically equivalent to that of FIG. 8 (with m replaced by $m\sqrt{l}$). Similarly, if l is twice a perfect square, then the structure of FIG. 15 becomes topologically equivalent to that of FIG. 14 (with m replaced by $m\sqrt{l/2}$). In fact, the only cases where FIG. 15 can represent a reflective n-star that cannot be represented by either FIG. 8 or 14 is the factorization of l contains odd powers of any prime other than two.

As an example, let us consider the case of $l=3$. It is known that transmissive 3×3 stars can be constructed. Moreover, applying to these structures the same bisection procedure used to obtain FIG. 10 from FIG. 1, reflective 3-stars can be constructed. Using this value of l, and say, also picking $m=3$, it is possible to use FIG. 15 to construct a reflective 27-star. In fact, upon elimination of the missing ports in FIG. 15, which are indicated by the dots, that figure itself becomes a representation of a reflective 27-star.

In conclusion, the construction of reflective, single-mode, fiber-optic, n-star couplers, for n equalling an arbitrary multiple of a perfect square ($n=lm^2$) have been disclosed. More specifically, because of restrictions on the component transmissive and reflective stars that are known to be realizable in practice, namely those based on radical-two and-three constructions, the value of m is restricted to be a product of arbitrary powers of two and three, while the value of l is restricted to be one, two or three times the product of even powers of two and three. Unless constructions based on prime radicals other than two and three becomes known, the above restrictions, for example, may limit reflective n-stars to $n=2, 3, 4, 8, 9, 12, 16, 18, 27, 32, 36, 48, 64, 72, 81, 108, 128, 144, 162, 192, 243, 256, 288, 324, 432, 512, 576, 648, 729, 768, 972, 1024, \ldots$, and so on, which, in fact, are not that limiting.

What is claimed is:

1. A single mode fiber passive star coupler having a number of ports n equal to an arbitrary multiple (l) of a perfect square ($m^2$) of an arbitrary number (m); characterized by ml transmissive m×m stars, the ports i of the l transmissive m×m stars of l-group i, $i=1,2,\ldots$, m, are coupled together via a reflective l star; and the ports i of the l transmissive m×m stars of l group #j, $i,j=1,2\ldots$, m, $i\neq j$, are coupled via($m-1$) transmissive 1×1 stars to ports j of the l transmissive m×m stars of the l-group #i.

2. A single mode fiber passive star coupler having a number of ports equal to an arbitrary multiple (l) of a perfect square ($m^2$) of an arbitrary number (m) characterized by a first group of transmissive m×m star coupler; a second group of transmissive m×m star coupler, transmissive 1×1 star interposed between selected output ports of the first group of transmissive stars and selected output ports of the second group of transmissive stars, a first reflective star coupled to selective ports of the first group of transmissive star couplers, and a second reflective star coupled to selective ports of the second group of transmissive star couplers.

3. The star coupler of claim 2 further characterized in that for a reflective star coupler having n ports where n is equal to an arbitrary (l) multiple (m) of a perfect square ($n = lm^2$), there are ml transmissive m×m stars, $m(m-1)/2$ transmissive 1×1 stars, and m reflective 1 stars.

* * * * *